Jan. 14, 1930.  R. P. LANSING  1,743,222
YIELDING DRIVE FOR DYNAMO ELECTRIC APPARATUS
Filed Dec. 4, 1925  3 Sheets-Sheet 2

Witness
Martin H. Olsen

Inventor
Raymond P. Lansing
By Rector, Hibben, Davis & Macauley
His Attys

Jan. 14, 1930.  R. P. LANSING  1,743,222
YIELDING DRIVE FOR DYNAMO ELECTRIC APPARATUS
Filed Dec. 4, 1925  3 Sheets-Sheet 3

Witness
Martin H. Olsen.

Inventor
Raymond P. Lansing
By Rector, Hibben, Davis & Macauley
His Attys.

Patented Jan. 14, 1930

1,743,222

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

YIELDING DRIVE FOR DYNAMO-ELECTRIC APPARATUS

Application filed December 4, 1925. Serial No. 73,197.

My invention relates to a drive or transmission for the driving of a dynamo, and more particularly to dynamos or generators driven by internal combustion engines. The object of my invention is to provide a drive or transmission which shall be simple, efficient and reliable in action and capable of yielding in order to avoid shock or strain upon the dynamo or generator when the engine starts on its own power and suddenly accelerates, and also to relieve or avoid the shock or strain incident to the sudden stoppage of the engine when the dynamo is rapidly rotating. The various features of advantage and utility in construction and mode of operation will be apparent from the description hereinafter given.

Figure 1:
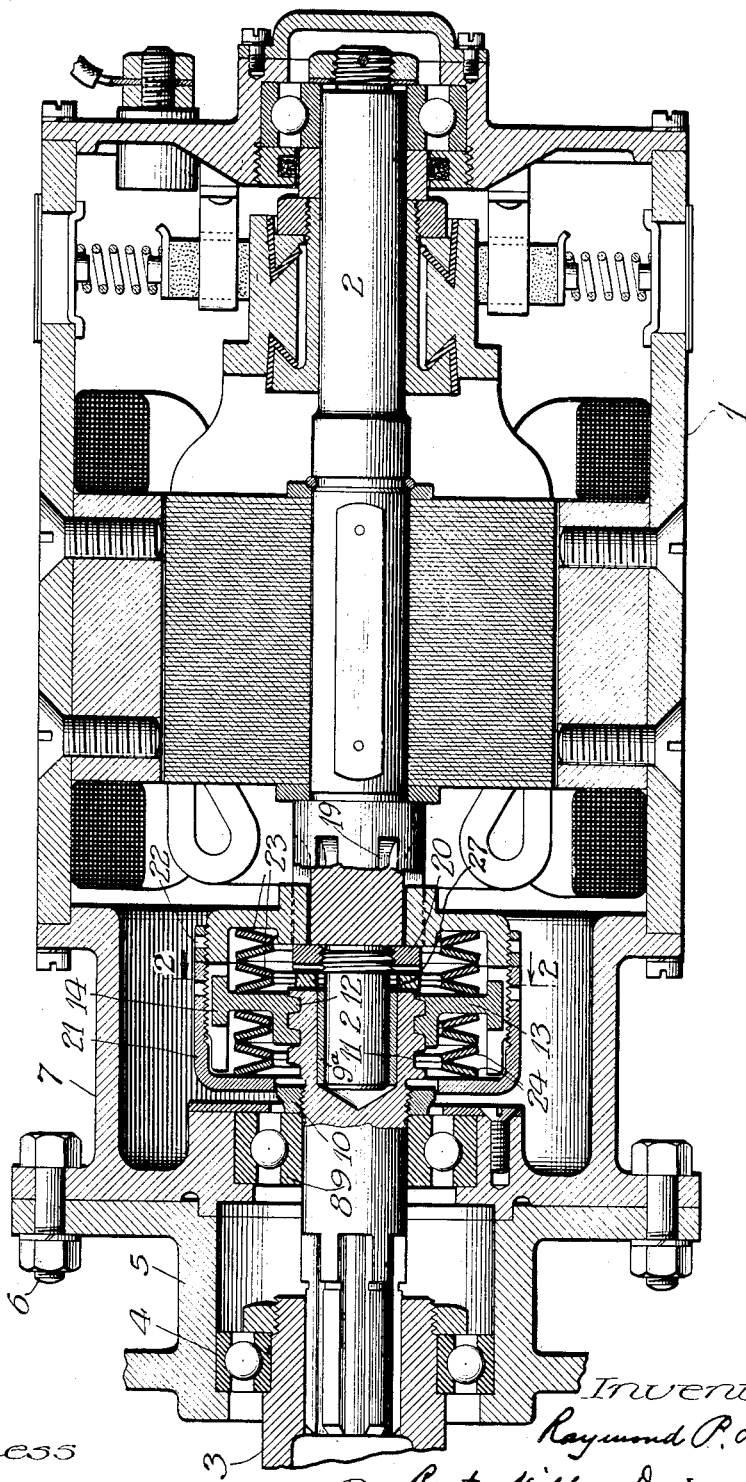
Figure 2:
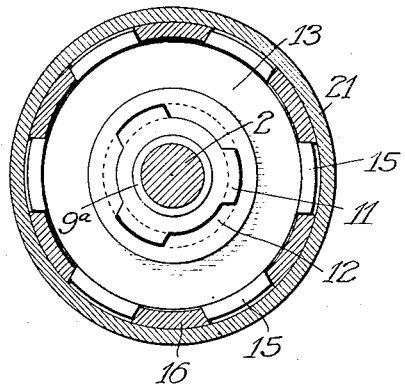
Figure 3:
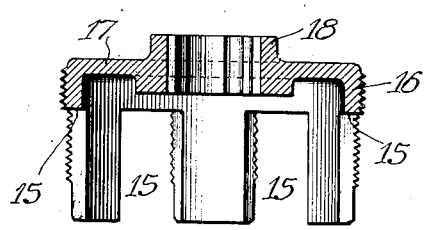
Figure 5:
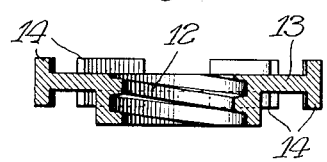
Figure 4:
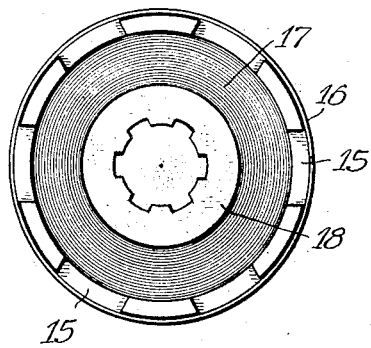
Figure 6:
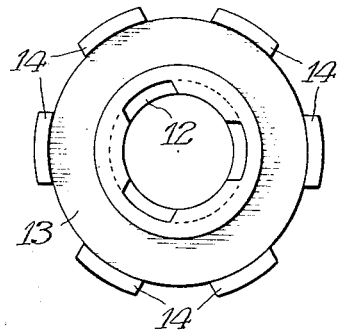

In the drawings, Figure 1 is a sectional elevation of my transmission or drive and the generator together with a small portion of a rotatable part of the engine such as an internal combustion engine; Fig. 2 a section on the line 2—2 of Fig. 1; Fig. 3 a section of a part of the barrel detached; Fig. 4 a plan view thereof; Fig. 5 a section of the nut; Fig. 6 a plan view thereof; and Fig. 7 a view similar to Fig. 1 but illustrating a modified form of construction.

Referring to the particular embodiment of my invention, which is illustrated in Fig. 1, the dynamo electric apparatus is here in the form of a generator 1 provided with an extended armature shaft 2 which in turn is operatively connected by the transmission or drive constituting my invention with some rotatable part of an engine or prime mover such as an internal combustion engine. In the present instance, this engine part is a rotatable shaft 3 which is journaled in bearings 4 in a casing 5 which is connected by bolts 6 with an extension casing 7 of the frame of the dynamo.

To the engine part 3, there is operatively connected as by splining a shaft 8 journaled in bearings 9 in the casing 7 and having its end adjacent the dynamo recessed to receive a bushing 9ª and the extended end of the armature shaft 2. This shaft 8 is held in proper position longitudinally by means of the collar 10 screwing thereupon and adapted to bear against the bearing 9. The outer end of the shaft 8 is provided with screw threads 11 on which is threaded a nut 12 having an annular flange 13 on whose periphery is a series of cross flanges or tongues 14. These tongues are adapted to fit and slide axially in the grooves 15 of a barrel 16.

The barrel 16 is closed at its end 17 adjacent the dynamo and is provided with a hub 18 which is operatively connected with the armature shaft as by means of splines and the nut 20 screwing onto the extended armature shaft 2. A cap or closure 21 screws upon the barrel and is held in place thereon in suitable manner as by means of a locking ring 22. To prevent endwise movement of shaft 8, a spacer washer 27 is interposed between its inner end and nut 20.

Yielding means which in the present instance are the two sets of dished washers 23 and 24 are interposed between the flange 13 of the nut and the ends of the barrel enclosure, one set of these washers being arranged on one side of such flange and the other upon the other side thereof whereby movement of the nut in either direction is resisted. Both sets of these spring washers are normally under compression.

Describing the operation of my transmission or drive, when the engine is started and the engine part 3 and shaft 8 are thereby rotated, the nut 12, according to the particular construction being described, will move to the left in Fig. 1 and will continue to move in that direction especially in the event of very sudden and forcible acceleration of the engine while the armature stands still. When the endwise pressure of the washers balances the endwise or longitudinal component of the nut, then the longitudinal travel of the nut will cease and rotation of the complete assembly including barrel, nut and washers will occur, thereby giving gradual acceleration to the armature. It will be understood that in this movement of the nut to the left the washers 23 assist that movement, and such movement is resisted only by the other set of washers 24. After the armature has been accelerated and has reached a constant speed, the longitudinal pressure on the righthand face of the nut gradually decreases, causing the nut to gradually travel back to its original or normal position shown in Fig. 1.

In the event that the engine should suddenly be slowed down or stopped while the armature is rapidly rotating, the armature speed is not correspondingly decreased with the result that the nut will travel to the right until its endwise component is balanced by the pressure of the washers.

As a result of the use of my transmission or drive, the sudden and forcible acceleration of the engine has no injurious effect upon the dynamo inasmuch as the transmission prevents such sudden and rapid rotation from being applied to the dynamo and applies the torque to such dynamo in a gradual and noninjurious manner. This transmission or drive is of special application and utility in the case of airplane engines where sudden and tremendous acceleration of the engine is liable to shear the driving shaft between the engine and the dynamo, and also to injuriously affect the dynamo elements.

Figure 7:
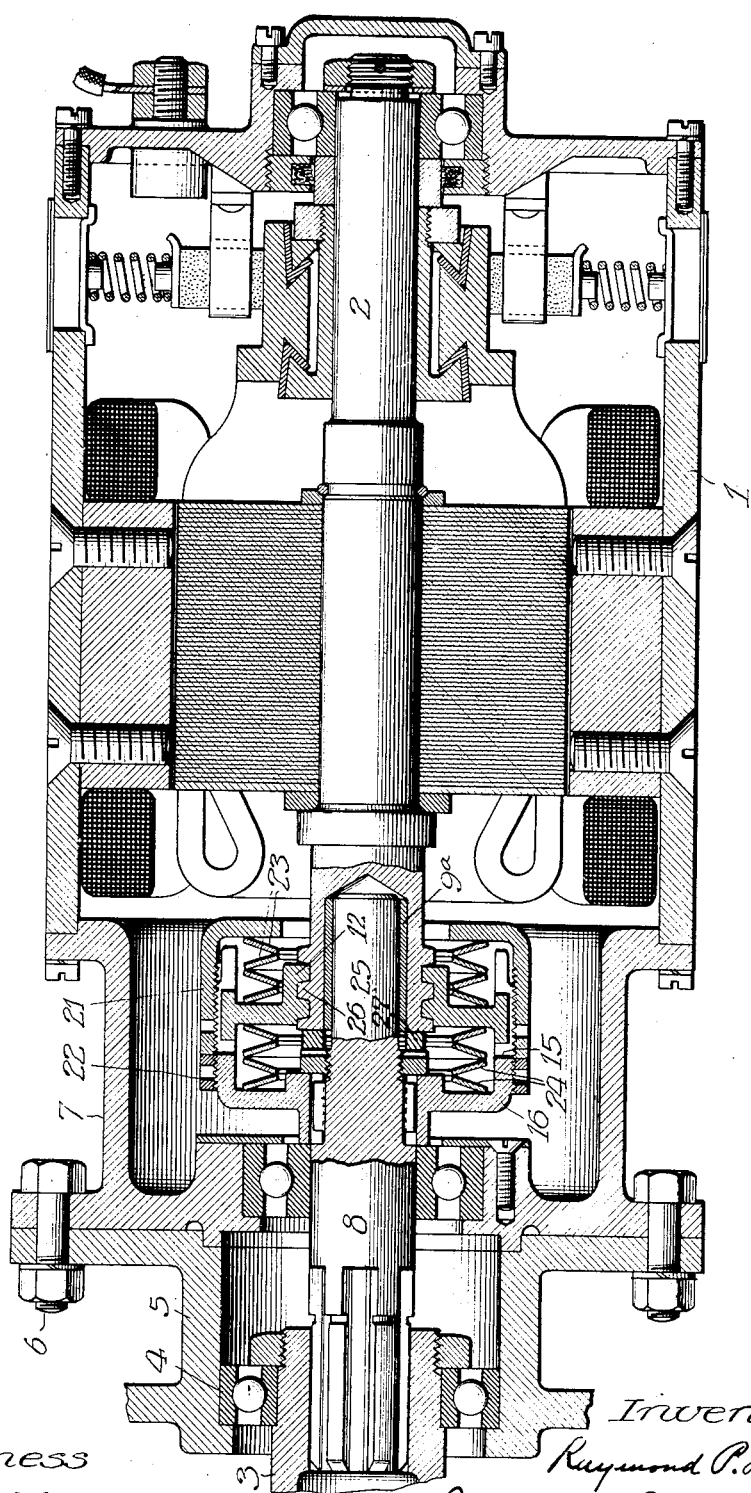

In Fig. 7, I have shown a modified form of construction according to which certain of the parts are reversed, particularly in that the armature shaft itself is the threaded shaft and the barrel is operatively connected with the shaft 8 instead of the armature shaft. According to this modification the shaft 8 has a reduced end portion 25 which is received in the recessed outer end of the armature shaft. This armature shaft has screw threads 26 on which the nut 12 is threaded. The barrel 16 is here secured to the shaft 8. The mode of operation of this modified construction is the same as that above described.

I claim:

1. In combination with an engine and a rotatable shaft operated thereby, and a dynamo electric machine having an armature shaft, a yielding drive therebetween constantly connecting such shafts and including a connecting member mounted on one of said shafts for longitudinal movement thereon and rotary movement therewith, and two sets of dished washers, one set located and exerting pressure on one side of said member and the other set located on and exerting pressure on the other side thereof, said washers tending to resist longitudinal movement of said member in either direction.

2. In combination with an engine and a dynamo electric machine having an armature shaft, a yielding drive therebetween including a driving shaft operatively connected with the engine, and in axial alinement with the armature shaft, a connecting member mounted on said driving shaft for longitudinal movement thereon and rotary movement therewith, and yieldable means interposed between said member and the armature shaft, and also between such member and the driving shaft and comprising dished washers exerting pressure against opposite sides of such member.

3. In combination with a variable speed engine and a dynamo electric machine having an armature shaft and an extension casing provided with a bearing, a driving shaft operatively connected with the engine and journaled in said bearing and disposed in axial alinement with the armature shaft, and a yieldable driving connection between said two shafts and located within said casing comprising a connecting movable member mounted on the driving shaft for longitudinal movement thereof and rotary movement therewith and operatively connected with the armature shaft, and yieldable means tending to resist said longitudinal movement of the connecting member.

4. In combination with a variable speed engine and a dynamo electric machine having an armature shaft and an extension casing provided with a bearing, a driving shaft operatively connected with the engine and journaled in said bearing and disposed in axial alinement with the armature shaft, and a yieldable driving connection between said two shafts and located within said casing comprising a connecting movable member mounted on the driving shaft for longitudinal movement thereof and rotary movement therewith and operatively connected with the armature shaft, and yieldable means tending to resist said longitudinal movement of the connecting member in both directions.

In testimony whereof, I have subscribed my name.

RAYMOND P. LANSING.